United States Patent [19]

Heldenbrand

[11] Patent Number: 4,674,120
[45] Date of Patent: Jun. 16, 1987

[54] HOOK SWITCH ACTUATOR ASSEMBLY

[75] Inventor: Stanley W. Heldenbrand, San Jose, Calif.

[73] Assignee: Northern Telecom Limited, Montreal, Canada

[21] Appl. No.: 796,955

[22] Filed: Nov. 12, 1985

[51] Int. Cl.⁴ ............................................. H04M 1/08
[52] U.S. Cl. ..................................... 379/427; 379/429-
[58] Field of Search ............... 379/427, 424, 426, 429, 379/436, 435

[56] References Cited

U.S. PATENT DOCUMENTS

| | | | |
|---|---|---|---|
| 3,448,225 | 6/1969 | Stromer | 379/427 |
| 3,558,832 | 1/1971 | Bonis et al. | 379/424 |
| 4,188,512 | 2/1980 | Lord | 379/427 |
| 4,268,726 | 5/1981 | Chu | 379/427 |
| 4,517,419 | 5/1985 | Kosten | 379/424 |
| 4,517,420 | 5/1985 | Haskins | 379/426 |

Primary Examiner—Thomas W. Brown
Attorney, Agent, or Firm—Schwartz, Jeffery, Schwaab, Mack, Blumenthal & Evans

[57] ABSTRACT

An actuator assembly for operating a hook switch in a telephone set includes an actuating member with a cantilever leaf spring. The actuating member is pivotally mounted to the inner surface of the cover and is biased toward the inner surface of the cover by the cantilever leaf spring. In the absence of a handset, the actuating member partially protrudes through an aperture in the cover into a cradle formation. Placement of a handset into the cradle formation pivots the actuating member away from the inner surface of the cover to actuate the hook switch.

5 Claims, 2 Drawing Figures

HOOK SWITCH ACTUATOR ASSEMBLY

FIELD OF THE INVENTION

The invention is in the field of telephone station apparatus and, more particularly, is an actuator assembly for operating a hook switch in a telephone set.

BACKGROUND OF THE INVENTION

Hook switch actuator assemblies using pivotable actuating members are known. For example, U.S. Pat Nos. 3,558,832 and 4,517,420 show hook switch actuating assemblies in which an actuating member is pivotally mounted to a telephone set base and mechanically biased by a coil spring. A handset placed against the actuating member pivots the actuating member against the bias of the coil spring to actuate the hook switch. The coil spring returns the actuating member to its original position when the handset is removed.

Other known hook switch actuator assemblies rely on resilient elements of the hook switch to mechanically bias a pivotally mounted actuating member. U.S. Pat Nos., 3,448,225, 4,268,726 and 4,517,419, for example, show a pivotally mounted actuating member resting against cantilever spring contact members of the hook switch. A handset placed against the actuating member, pivots the actuating member to depress the cantilever spring contact members, actuating the hook switch. The cantilever spring contact members return to their original position when the handset is removed, pivoting the actuating member back to its original position.

The present invention overcomes the need for a coil spring without relying on resilient elements of the hook switch to mechanically bias the pivotally mounted actuating member. The actuating member includes an integral cantilever spring for mechanical biasing and is pivotally mounted to a telephone set cover.

SUMMARY OF THE INVENTION

The present invention is an actuator assembly for operating a hook switch in a telephone set. The telephone set has a base to which a hook switch is fixed and a cover carried by the base. The cover has an outer surface, an inner surface, a cradle formation for receiving a handset against the outer surface, and an aperture in the cradle formation extending from the outer surface to the inner surface.

The actuator assembly comprises pivot and stop formations depending from the inner surface of the cover and an actuating member for actuating the hook switch. The actuating member is pivotally mounted to the pivot formation and aligned with the aperture in the cradle formation. It includes a cantilever spring means supported by the stop formation. The cantilever spring means urges the actuating member toward the inner surface of the cover to partially protrude through the aperture. Placement of the handset in the cradle formation pivots the actuating member away from the inner surface of the cover to actuate the hook switch.

In one embodiment of the invention, the actuating member comprises a body portion pivotally mounted to the pivot formation, a cantilever leaf spring fixed to the body portion, and two arms extending from the body portion substantially parallel to the cantilever leaf spring. The cantilever leaf spring has a first end fixed to the body portion and a second end supported by the stop formation. One of the two arms actuate the hook switch, while the other protrudes through the aperture to engage the handset when it is placed in the cradle formation.

DESCRIPTION OF THE DRAWINGS

An example embodiment of the invention is discussed below with reference to the accompanying drawings in which.

DESCRIPTION OF AN EXAMPLE EMBODIMENT

Figure 1:
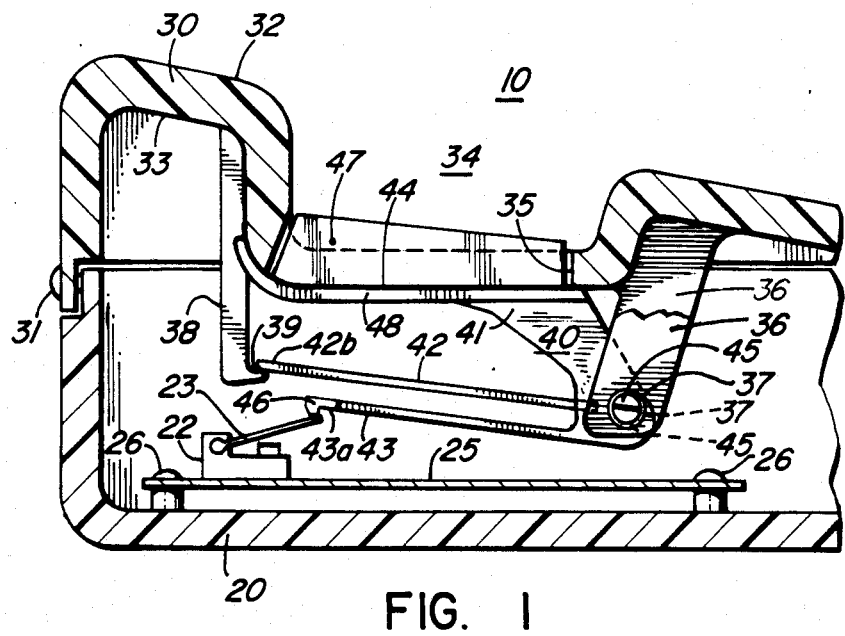
FIG. 1 is a side elevation view, partly in section, of a hook switch actuator assembly in accordance with the invention.

In the drawings, and in the discussion of an example embodiment which follows, corresponding parts are identified by the same reference characters.

Figure 2:
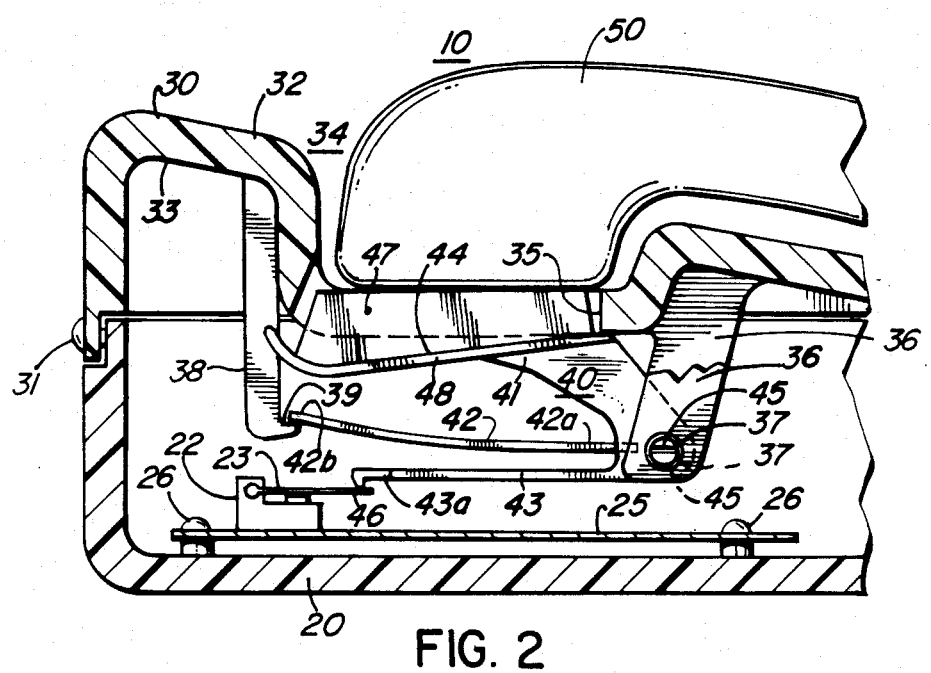
FIG. 2 is a side elevation view similar to FIG. 1.

As illustrated in FIGS. 1 and 2, a telephone set 10 has a base 20 and a hook switch in the form of a sealed microswitch 22 with an integral actuating lever arm 23, such as a Honeywell 311SM704-1758 microswitch. The microswitch 22 is fixed to a circuit board 25 which is fastened to the base 20 in a convenient manner, such as by screws 26. A telephone set cover 30 is carried by and fastened to the base 20 in a convenient manner, for example by screw 31. The cover 30 has an outer surface 32 and an inner surface 33. The cover 30 also has a cradle formation in form of a cup-shaped depression 34 for receiving a handset 50 against the outer surface 32 as shown in FIG. 2. An aperture in the form of a rectangular slot 35 at the base of the cup-shaped depression 34 extends from the outer surface 32 to the inner surface 33. A pivot formation, conveniently in the form of a two-legged bracket 36, depends from the inner surface 33 of the cover 30. The bracket 36 is aligned with the rectangular slot 35 and includes socket means in the form of circular holes 37 axially aligned substantially perpendicular to the slot 35. A stop formation in the form of a limb 38 bearing a shelf 39 also depends from the inner surface 33 of the cover 30. The limb 38 and the shelf 39 are aligned with the rectangular slot 35 and opposite the bracket 36. An actuating member 40 aligned with the slot 35 is pivotally mounted to the bracket 36. In the example embodiment, the actuating member 40 comprises a body portion 41, a cantilever spring means in the form of a cantilever leaf spring 42, a first arm 43 and a second arm 44. Conveniently, the body portion 41 of the actuating member 40 has two champfered right-cylindrical projections 45 which ride in the circular holes 37 of bracket 36 to effect the pivotal mounting. The cantilever leaf spring 42 has a first end 42a fixed to the body portion 41 of the actuating member 40 and a second end 42b resting on the shelf 39 on the limb 38 depending from the inner surface 33 of the cover 30. The first arm 43 extends from the body portion 41 of the actuating member 40 substantially parallel to the cantilever leaf spring 42. A free end 43a of the first arm 43 rests on the actuating lever arm 23 of the microswitch 22. In the example embodiment, a transverse semi-cylindrical projection 46 at the end 43a of the first arm 43 makes contact with the actuating lever arm 23. The second arm 44 extends from the body portion 41 of the actuating member 40 substantially parallel to the cantilever leaf spring 42 and the first arm 43. The second arm 44 is aligned with the rectangular slot 35 in the cover 32, and can be pivoted so as to partially protrude through the slot 35 into the cup-shaped depression 34. In the illustrated embodiment, the second arm 44 has a raised portion in the form of a rib 47 for protruding through the slot 35, and a lateral projection in the form of a flange 48 contoured to bear against the inner surface 33 of the cover around the slot 35, so as to limit the protrusion of the rib 47 through the slot 35. The cantilever leaf spring 42 urges the actuating member 40 to pivot toward the inner surface 33 of the cover 30. FIG. 1 illustrates the position of the actuating member 40 when the handset 50 is not present in the cup-shaped depression 34. In this position, the flange 48 bears against the inner surface 33 of the cover around the slot 35, and the rib 47 partially protrudes through the slot 35 into the cup-shaped depression 34.

FIG. 2 illustrates the position of the actuating member 40 when the handset 50 is placed in the cup-shaped depression 34. The handset 50 presses on the rib 47 to pivot the actuating member 40 against the mechanical bias of the cantilever leaf spring 42. As the actuating member 40 pivots, the first arm 43 depresses the actuating lever arm 23 to change the state of microswitch 22. When the handset 50 is removed from the cup-shaped depression 34, the cantilever leaf spring 42 returns the actuating member 40 to the position illustrated in FIG. 1, allowing the actuating lever arm 23 to rise, restoring the original state of microswitch 22.

The body portion 41, the first arm 43 and the second arm of the actuating member 40 shown in the example embodiment are injection molded from a synthetic plastic material such as acetal homopolymer (trade name DELRIN) to comprise a single molded synthetic plastic part. The cantilever leaf spring 42 is stamped from #302 stainless steel and embedded in the body portion 41 of the actuating member 40 during the injection molding process using techniques well known in the synthetic plastic molding art.

What is claimed is:

1. An actuator assembly for operating a hook switch in a telephone set, the telephone set having a base to which the hook switch is fixed, and a cover carried by the base, the cover having an outer surface, an inner surface, a cradle formation for receiving a handset against the outer surface, and an aperture in the cradle formation extending from the outer surface to the inner surface, the actuator assembly comprising:

pivot and stop formations depending from the inner surface of the cover; and an actuating member pivotally mounted to the pivot formation and aligned with the aperture for actuating the hook switch, the actuating member including a cantilever spring means supported by the stop formation for urging the actuating member toward the inner surface of the cover to partially protrude through the aperture;

whereby placement of the handset in the cradle formation pivots the actuating member away from the inner surface of the cover and actuates the hook switch.

2. The actuator assembly of claim 1 wherein the actuating member comprises:

a body portion pivotally mounted to the pivot formation;

the cantilever spring means, comprising a cantilever leaf spring having a first end fixed to the body portion and a second end supported by the stop formation;

a first arm, extending from the body portion substantially parallel to the cantilever leaf spring, for actuating the hook switch; and a second arm, extending from the body portion substantially parallel to the cantilever leaf spring and aligned with the aperture, for protruding through the aperture.

3. The actuator assembly of claim 2 wherein the second arm has a raised portion for protruding through the aperture and a lateral projection for bearing against the inner surface of the cover to limit the protrusion of the second arm through the aperture.

4. The actuator assembly of claim 3 wherein the body portion has two champfered right-cylindrical projections aligned on an axis substantially perpendicular to the cantilever leaf spring for rotatably riding in socket means in the pivot formation.

5. The actuator assembly of claim 4 wherein:

the body portion, the first arm and the second arm together comprise a single molded synthetic plastic part;

the cantilever leaf spring comprises a stamped metal part; and the first end of the cantilever leaf spring is embedded in the body portion.

* * * * *